United States Patent
Beatty

[19]

[11] Patent Number: 6,134,616
[45] Date of Patent: Oct. 17, 2000

[54] METHOD AND APPARATUS FOR DYNAMIC RE-ENUMERATION AND RECONFIGURATION OF COMPUTER DEVICES AFTER SYSTEM HIBERNATION

[75] Inventor: Dana Lynn Beatty, Austin, Tex.

[73] Assignee: International Business Machines Corporation, Armonk, N.Y.

[21] Appl. No.: 08/740,172

[22] Filed: Oct. 28, 1996

[51] Int. Cl.[7] .................................................. G06F 13/00
[52] U.S. Cl. .......................................... 710/104; 713/323
[58] Field of Search ............................. 395/284, 750.05, 395/182.22, 182.13, 651; 364/273.4; 710/104, 10; 713/323; 714/15, 24

[56] References Cited

U.S. PATENT DOCUMENTS

| | | | |
|---|---|---|---|
| 4,589,063 | 5/1986 | Shah et al. ............................... | 364/200 |
| 4,672,573 | 6/1987 | Shonaka .................................. | 364/900 |
| 4,731,748 | 3/1988 | Haneda .................................... | 364/900 |
| 5,014,193 | 5/1991 | Garner et al ........................... | 364/200 |
| 5,038,320 | 8/1991 | Heath et al. ............................. | 364/900 |
| 5,056,001 | 10/1991 | Sexton .................................... | 364/200 |
| 5,121,500 | 6/1992 | Arlington et al. ....................... | 395/750 |
| 5,220,654 | 6/1993 | Benson et al. .......................... | 395/275 |
| 5,247,659 | 9/1993 | Curran et al. ........................... | 395/575 |
| 5,297,282 | 3/1994 | Meilak et al. ........................... | 395/700 |
| 5,313,628 | 5/1994 | Mendelsohn et al. ................... | 395/575 |
| 5,339,426 | 8/1994 | Aoshima ................................. | 395/700 |
| 5,386,552 | 1/1995 | Garney .................................... | 395/575 |
| 5,410,713 | 4/1995 | White et al. ............................. | 395/750 |
| 5,430,866 | 7/1995 | Lawrence et al. ...................... | 395/575 |
| 5,655,148 | 8/1997 | Richman et al. ........................ | 710/8 |
| 5,664,118 | 9/1997 | Nishigaki et al. ...................... | 395/283 |
| 5,748,980 | 5/1998 | Lipe et al. ............................... | 710/8 |
| 5,787,246 | 7/1998 | Lichtman et al. ....................... | 709/220 |
| 5,793,979 | 8/1998 | Lichtman et al. ....................... | 709/226 |
| 5,809,329 | 9/1998 | Lichtman et al. ....................... | 710/8 |
| 5,819,107 | 10/1998 | Lichtman et al. ...................... | 710/8 |

OTHER PUBLICATIONS

IBM Technical Disclosure Bulletin vol. 34 No. 6, pp. 444–449, Nov. 1991.

*Primary Examiner*—Glenn A. Auve
*Attorney, Agent, or Firm*—Jeffrey S. LaBaw; Felsman, Bradley, Vader, Gunter & Dillon, LLP

[57] ABSTRACT

A system component manages the system view of hardware for a set of devices, containing information about each hardware device including the device id, the location of the device, and the system resources allocated to the device. This system component is responsible for enumerating all devices present when the system is resumed from a suspended state, including the reconfiguration of devices which were present at the time the system was suspended. An accurate system view of devices present when the system resumes from a suspended state is thereby created. The configuration of devices present when the system was suspended is restored faster and more efficiently than through utilization of individual device drivers.

17 Claims, 6 Drawing Sheets

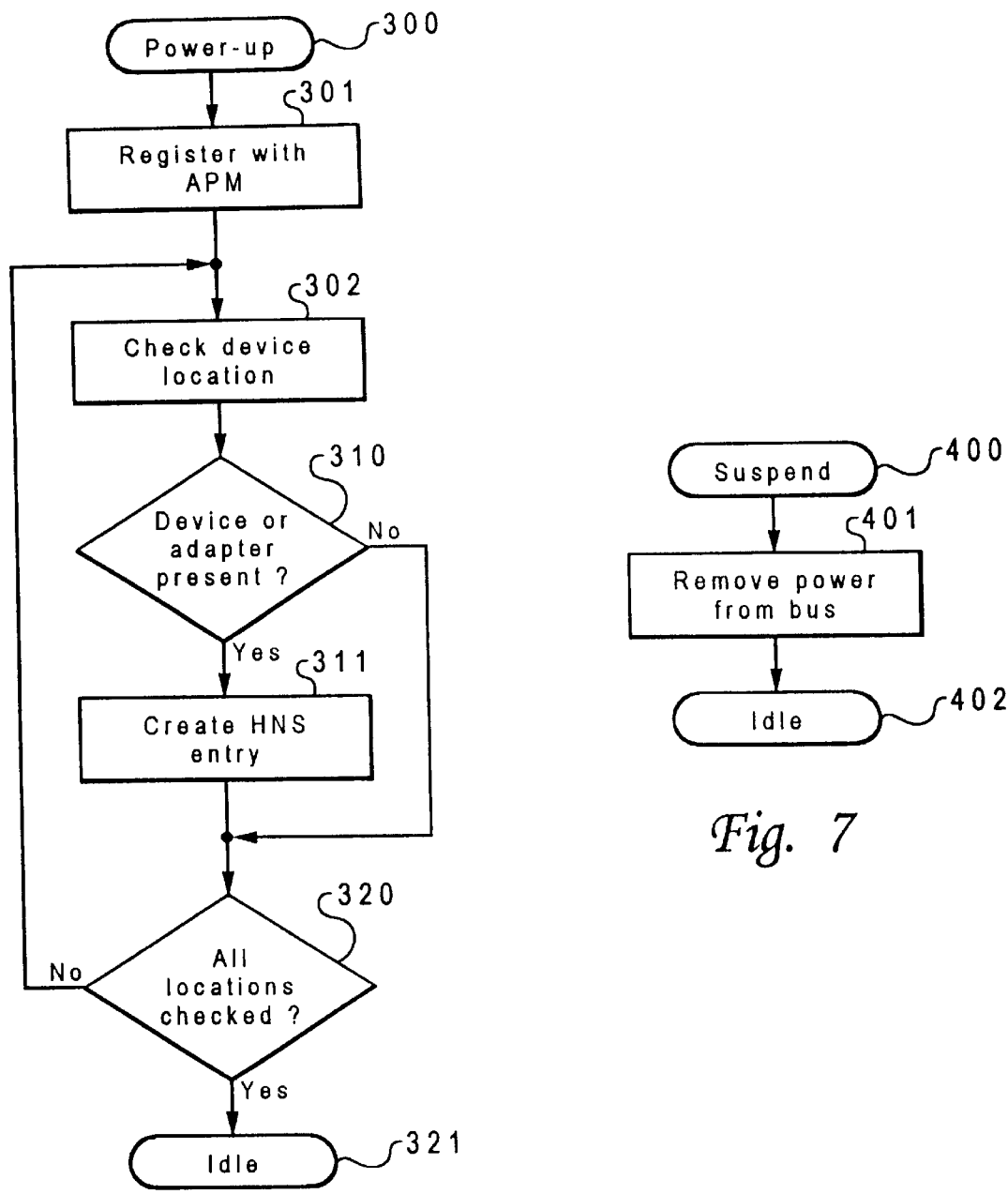

METHOD AND APPARATUS FOR DYNAMIC RE-ENUMERATION AND RECONFIGURATION OF COMPUTER DEVICES AFTER SYSTEM HIBERNATION

BACKGROUND OF THE INVENTION

1. Technical Field

The present invention relates in general to a power management scheme in a data processing system which provides an accurate reflection of the hardware devices currently attached to the data processing system after the data processing system is resumed from a suspended state, even if devices have been removed, added, or changed while the system was suspended, and in particular to a power management scheme which also restores the configuration of devices present both when the data processing system is suspended and when it is resumed. Still more particularly, the present invention relates to a power management scheme which shifts responsibility for reconfiguring devices away from the individual device drivers so that less time is required to re-awaken the data processing system, less code is required to allow power management for all devices, and the same device drivers may be utilized on both power managed and non-power managed operating systems.

2. Description of the Related Art

Power management is a means of conserving power on battery operated data processing systems. The data processing system and its devices are put into various states of suspension in order to reduce the drain on the battery. The data processing system is commanded into these various states when it is determined that utilization of the data processing system and its devices is not needed. For example, if data has not been written to the hard drive for a given period of time, the drive ceases to spin in order to conserve energy.

Current power management software implementations require software controlling the device to be power management aware. Often this requires the software to conform to a standard such as Advanced Power Management (APM) or to register for suspend/resume notification. Typically, when the power management component determines that the data processing system should go into a suspend state, it notifies all registered clients that it is going into a suspend state. Likewise, when the power management component determines it is necessary to resume the power level on the data processing system, it notifies registered clients of this impending event. Current implementations require the device driver, or client, to restore the device configuration.

In order for a device or adapter attached to a base system device to have its configuration restored, the device driver, or client, must be power management enabled. Each client must contain code to handle the suspend/resume event and reinstate the device configuration.

Current implementations of power management software also assume that the same set of devices present when the data processing system was suspended are also present when the data processing system is resumed, which is not always the case. For example, a portable data processing system could be suspended while connected to a docking station, but removed from the docking station while still in the suspended state. When the data processing system is resume, current implementations would attempt to restore the data processing system as though it were still connected to the docking station.

Therefore, it would be desirable to have a power management system which accurately reports the hardware topology of the data processing system when it resumes from suspended state. It would also be desirable for such a power management system to shift responsibility for reconfiguring devices away from individual device drivers.

SUMMARY OF THE INVENTION

It is therefore one object of the present invention to provide a power management scheme in computers which provides an accurate reflection of the hardware devices currently attached to the data processing system after the data processing system is resumed from a suspended state, even if devices have been removed, added, or changed while the data processing system was suspended.

It is another object of the present invention to provide a power management scheme which also restores the configuration of devices present both when the data processing system is suspended and when it is resumed.

It is yet another object of the present invention to provide a power management scheme which shifts responsibility for reconfiguring devices away from the individual device drivers so that less time is required to re-awaken the system, less code is required to allow power management for all devices, and the same device drivers may be utilized on both power managed and non-power managed operating systems.

The foregoing objects are achieved as is now described. A system component registered with a power management component manages the system view of hardware for a domain of devices, containing configuration information about each hardware device at a location within that domain. This system component is responsible for checking each location within the domain for devices when the system is resumed from a suspended state and configuring any devices which are detected, including reconfiguration of devices which were present at the time the system was suspended. An accurate system view of devices present when the system resumes from a suspended state is thereby created. The configuration of devices present when the system was suspended is restored faster and more efficiently than through utilization of individual device drivers.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 depicts a high level flow chart of a process executed when the system initializes in accordance with a preferred embodiment of the present invention;

FIG. 7 is a high level flow chart of a process executed when a suspend notification is received from the system in accordance with a preferred embodiment of the present invention.

DETAILED DESCRIPTION OF THE PREFERRED EMBODIMENT

Figure 1:
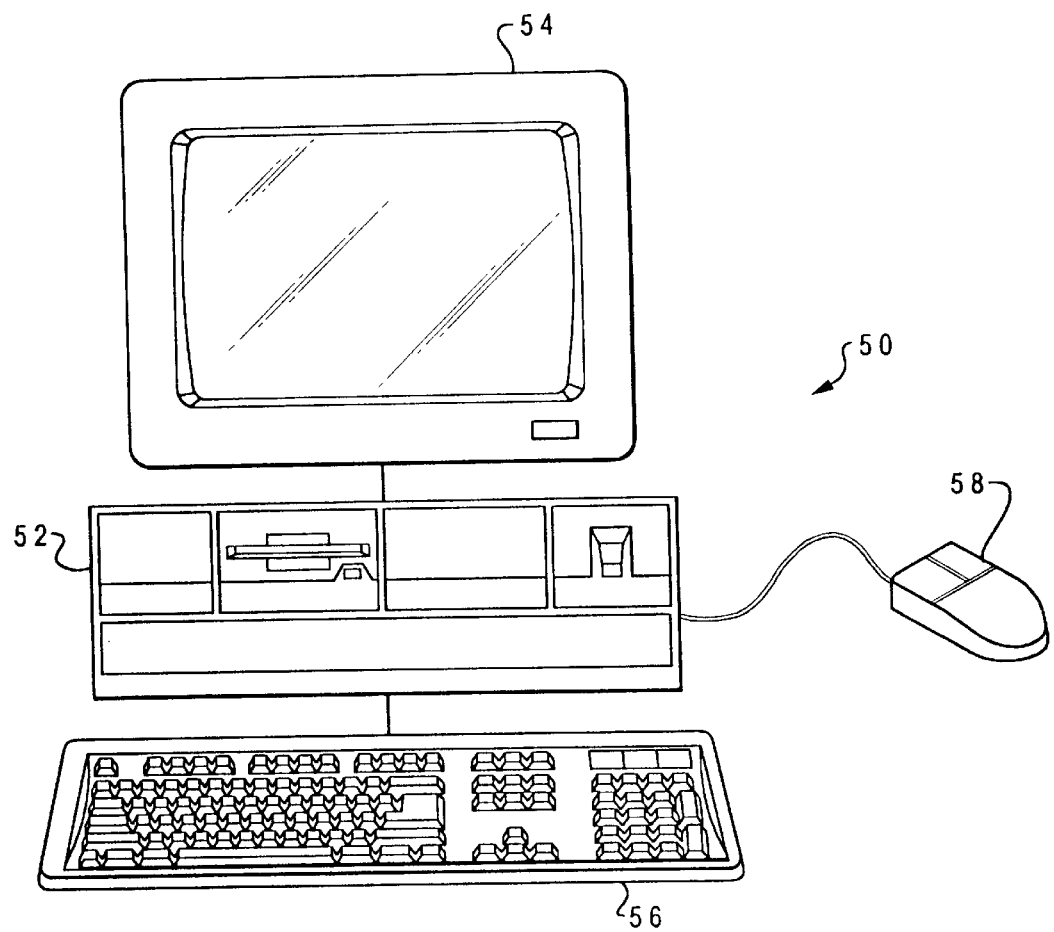
FIG. 1 is a pictorial representation of a personal computer that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM ThinkPad 755, a product of International Business Machines Corporation, located in Armonk, N.Y. Although the depicted embodiment involves a personal computer, a preferred embodiment of the present invention may be implemented in other types of data processing systems, such as for example, intelligent work stations or minicomputers. It will be understood by those of skill in the art that the present invention is also suitable for use in power managed portable computers, such as laptops, notebooks, and subnotebooks.

Figure 2:
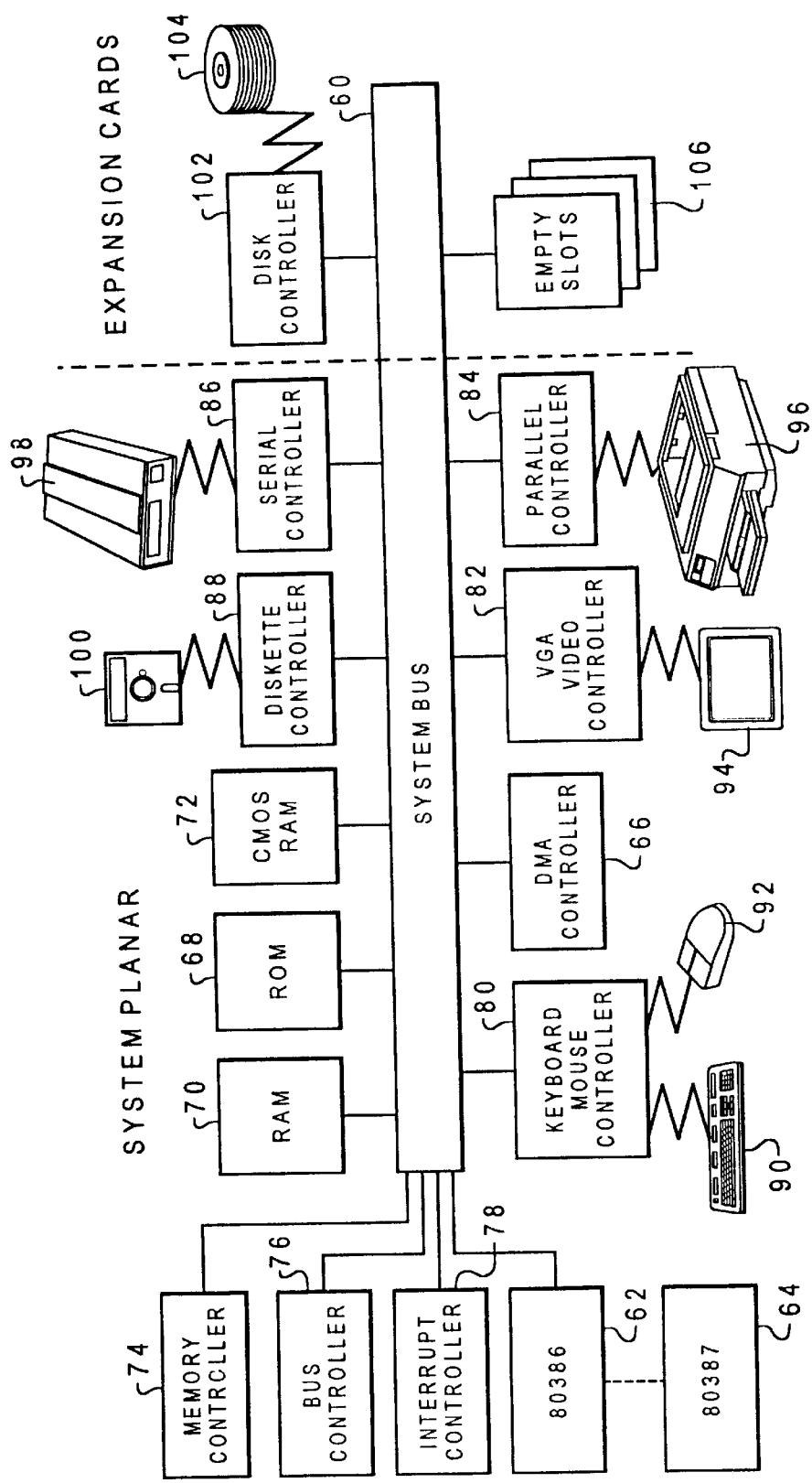
FIG. 2 depicts a block diagram of selected components in the personal computer represented in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60, and also may be connected to numeric coprocessor 64. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640 K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk drive, an audio adapter, high resolution graphics adapter, and the like also may be utilized in addition to or in place of the hardware already depicted to enable personal computer 50 to present multimedia presentations to a utilizer.

Figure 3:
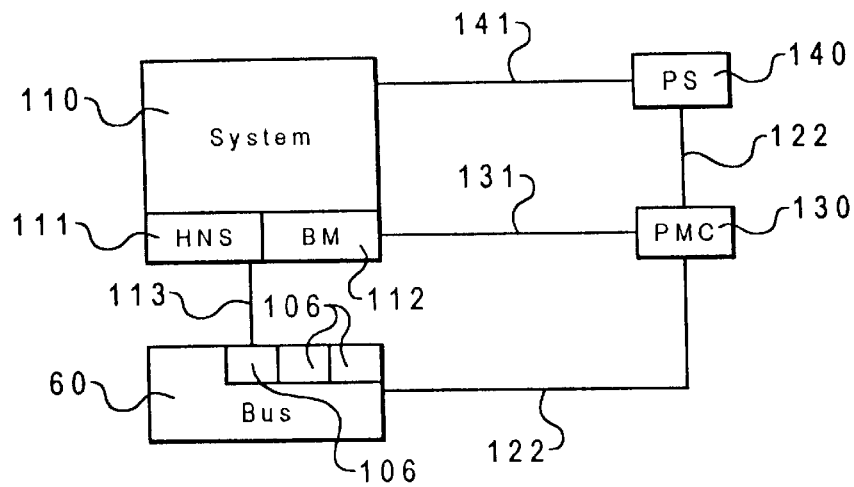
FIG. 3 is a detail of selected components in a personal computer such as represented in FIG. 1 in which a preferred embodiment of the present invention may be implemented.

With reference now to FIG. 3, detail of selected components in which a preferred embodiment of the present invention is practiced is depicted. System block 110 in FIG. 3 represents all hardware necessary for an operable computer except the hardware specifically shown. Power supply 140 supplies power through line 141 to system 110 and, under the control of an APM or power management component 130, through line 122 to bus 60. System 110, specifically the system component designated as bus manager 112, controls power management component 130 by means of line 131. Bus 60 includes a plurality of sockets or device locations 106 for device adapters or devices and is connected to system 110 through lines 113.

In a preferred embodiment of the present invention, the system view of hardware is placed in a name space tree or data structure called the Hardware Name Space (HNS) 111 in the system memory. This hierarchical tree is utilized to represent all physical system components and correlates each component to the bus on which the adapters and devices reside. Each bus is, in turn, managed by a system component called a bus manager (BM) 112. Although the preferred embodiment is illustrated with a single bus 600 and bus manager 112, any number of buses and corresponding bus managers which can be supported by system 110 may be utilized. The HNS need not have a hierarchical structure, although such a structure better conforms to the microkernel of existing operating system architectures.

Figure 4:
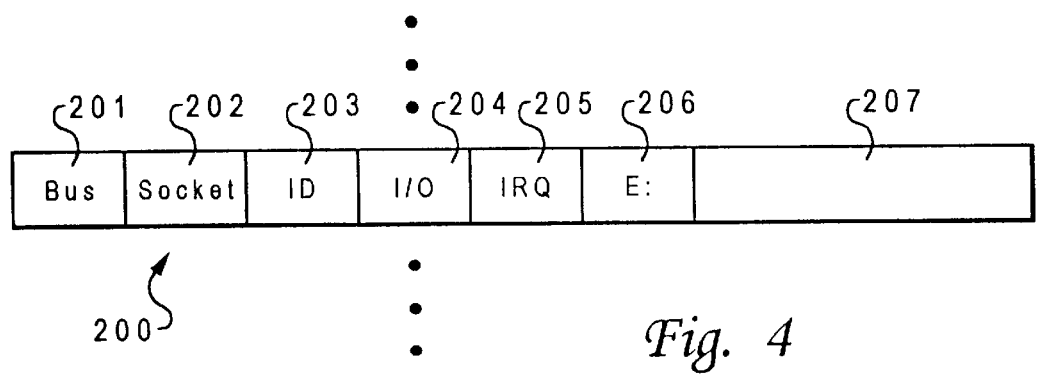
FIG. 4 depicts a system memory entry of configuration information corresponding to a specific device location in accordance with a preferred embodiment of the present invention.

Referring to FIG. 4, an HNS entry created by a bus manager and corresponding to a specific device is depicted. Bus managers are responsible for enumerating devices attached to their bus. Part of this enumeration process involves creating an HNS entry to represent each device or adapter attached to the bus. The HNS entry 200 contains information specific to each device and/or adapter on the bus. This information includes the identity of the bus 201, the socket within the bus 202, identification of system resources allocated to the device such as I/O space 203, IRQ 204, drive letter assignment 206, etc. The HNS entry also contains a unique device id 203 for the device/adapter, along with any other suitable information 207 such as the name of device drivers loaded to support the device or adapter. However, the HNS is preferably an object which contains only the system resources for each device/adapter. Other operating system components may use the HNS object to determine, for example, what device drivers are associated with specific devices/adapters allocating resources contained in the object.

Figure 5:
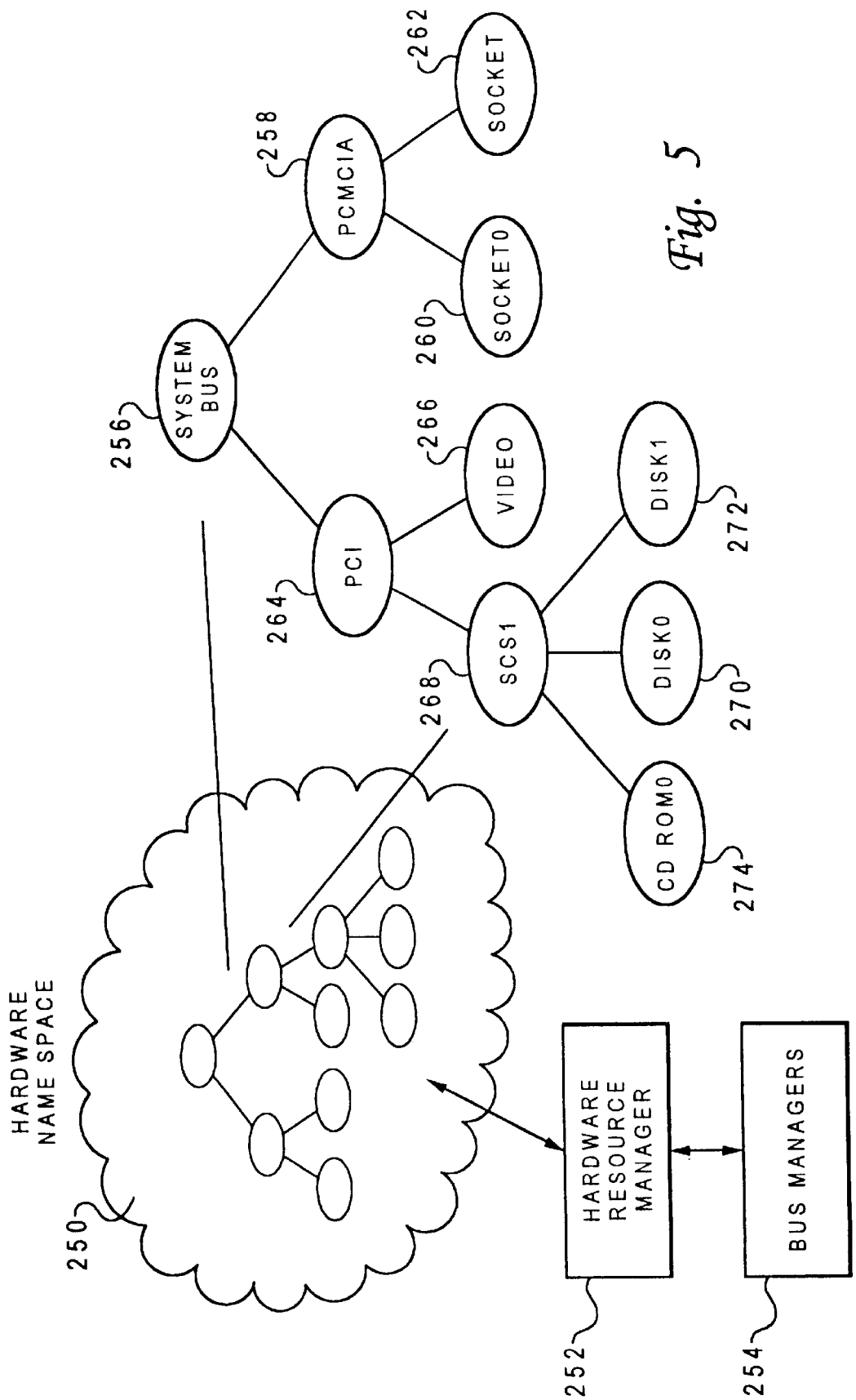
FIG. 5 is a diagram of the hierarchy of the Hardware Name Space (HNS) in accordance with a preferred embodiment of the present invention.

With reference now to FIG. 5, a diagram of the heirarchy of the HNS in accordance with a preferred embodiment of the present invention is shown. HNS 250 includes a hardware resource manager 252 and bus managers 254. A detail of the HNS 250 might reveal, for example, that system bus 256 has a number of hardware interfaces such as PCMCIA and PCI. Thus a PCMCIA bus manager 258 and a PCI bus manager 264 would be responsible for manager devices or resources connected to system bus 256 through the respective interfaces. For example, if two PCMCIA sockets 260 and 262 were present, PCMCIA bus manager 258 would be responsible for devices in those sockets. Similarly PCI bus manager 264 is responsible for adapters or device present in any PCI slots. This may include a video adapter 266 or an adapter to yet another bus type such as a SCSI adapter. SCSI bus manager 268 would be responsible for any SCSI devices connected through the SCSI adapter, such as hard disk drives 270 and 271 or CD-ROM drive 274.

Referring to FIG. 6, the operation of a bus manager at system initialization is illustrated. When the data processing system is initialized the bus manager is responsible for enumerating its bus. The process begins at step 300 and proceeds to step 301. Step 301 depicts the bus manager registering with the APM as a power management capable component. The process then proceeds to step 302. Steps 302 through 321 illustrates the bus manager "walking" its bus. Step 302 depicts the bus manager checking each device location on the bus to determine if any devices or device adapters are currently inserted. In the heirarchy depicted in FIG. 5, for example, the PCMCIA bus manager 258 would check socket 0 260 and socket 1 262.

Referring back to FIG. 6, the process passes at each device location, to step 310, which illustrates a determination of whether a device or device adapter is present at that location. If no device or device adapter is detected, the process proceeds to step 320, which depicts a determination of whether each device location has been checked.

Referring back to step 310, if a device or adapter is detected at the device location, the process passes to step 311, which illustrates creation of an HNS entry for the device/adapter. For each device or adapter present, the bus manager creates an HNS entry. The bus manager also reserves system resources for the device, and hence knows the configuration of the device. The process next passes to step 320, which depicts a determination of whether each device location has been checked. If each device location on the bus has not been checked, the process returns to step 302. Steps 302 through 321 are repeated as necessary until all device locations have been checked. Once it is determined that each device location on the bus has been checked, the process awaits further activity requiring its involvement.

Referring to FIG. 7, the operation of a bus manager when a suspend notification is received is depicted. The process begins at step 400 and proceeds to step 401, which illustrates the bus manager removing power from its bus. The process then awaits further activity requiring its involvement.

Figure 8:
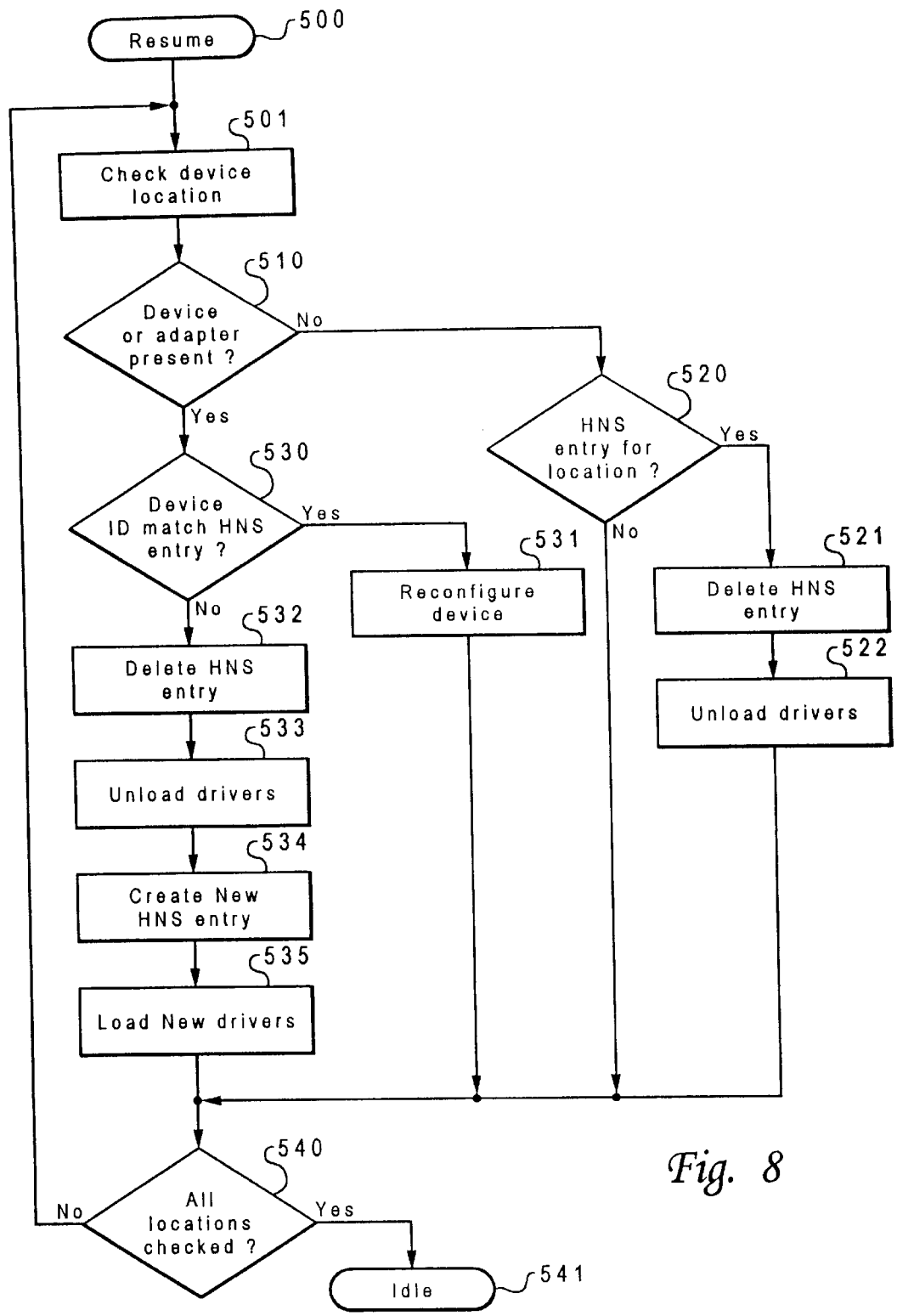
FIG. 8 depicts a high level flow chart of a process executed when a resume notification is received from the system in accordance with a preferred embodiment of the present invention.

With reference now to FIG. 8, the operation of a bus manager in accordance with the present invention when a resume notification is received is illustrated. Each HNS entry represents a physical device attached to a bus, and contains the resources required to support that device. When the system is resumed after being suspended, the bus manager, acting as parent of its devices, is able to re-enumerate its bus. The bus manager can determine if each device is present, missing, or changed, and can restore the configuration of devices present when the system was suspended. The bus manager can also identify dispensable configuration data, including system resources and devices drivers, associated with devices removed while the system was suspended. The process begins at step 500 and proceeds to step 501. Steps 501 through 540 illustrate the bus manager "walking" its bus in response to a resume notification. Step 501 depicts the bus manager checking each device location on the bus to determine if any devices or device adapters are currently inserted. At each device location, the process then passes to step 510, which illustrates a determination of whether a device or device adapter is present at that location. If no device or device adapter is detected, the process proceeds to step 520, which depicts a determination of whether an HNS entry exists for the device location checked. If an HNS entry exists for the device location checked, the process next passes to step 521, which illustrates deleting the HNS entry corresponding to the device location checked, and then to step 522, which depicts unloading any device drivers associated with the device formerly present at the location checked. The deleted HNS entry and unloaded device drivers are dispensable configuration data associated with the device formerly present at the location checked. The process then passes to step 540, which illustrates a determination of whether all device locations have been checked. If no HNS entry was found in step 520 for the device location checked, the process passes directly to step 540.

Referring back to step 510, if a device or device adapter is found at the device location being checked, the process proceeds to step 530. Step 530 illustrates a determination by the bus manager of whether the device or adapter present is the same device or adapter which was present when the system was suspended. The bus manager utilizes the list of HNS entries it created, checking the device id of the device or adapter found at the location and comparing it to the device id contained in the HNS entry for that device location or socket. If the device ids match, the process passes to step 531, which depicts reconfiguration of the device or adapter by the bus manager using resources contained in the corresponding HNS entry. The process then passes to step 540, which depicts a determination of whether each device location has been checked.

With reference again to step 530, if the device id for the device or adapter currently present in the socket does not match the device id in the HNS entry, the process passes to step 532. Steps 532 through 535 illustrates replacing configuration data and device drivers corresponding to the device formerly present at the location with configuration data and device drivers corresponding to the device found when the system resumes from a suspended state. Step 532 and 533 respectively depict the bus manager marking the current HNS entry for deletion and unloading any supporting device drivers for the device or adapter previously present at that location. The HNS entry may be immediately deleted, and the device drivers immediately unloaded, or the deletion and unloading may be deferred. The process next passes to step 534, which illustrates creation of a new HNS entry by the bus manager for the device or adapter found at the location checked, and then to step 535, which depicts the bus manager's loading any new device drivers required to support the device currently present at that location. The process then passes to step 540, which illustrates a determination of whether each device location has been checked. If each device location on the bus has not been checked, the process returns to step 501. Steps 501 through 540 are repeated as necessary until all device locations have been checked. Once it is determined that each device location on the bus has been checked, the process awaits further activity requiring its involvement.

By following this procedure for each location within the domain of device locations assigned to it, a bus manager can restore an accurate system view of the devices currently present when the system is resumed from a suspended state. For devices present both when the system is suspended and when it resumes, a bus manager can also restore the device configuration. This permits devices to be dynamically attached to or removed from the system regardless of the system state, providing greater flexibility to the end user. In addition, when an HNS entry is marked as deleted, the system resources allocated to the corresponding device are reclaimed and any software for controlling the device which is present in memory is removed. Thus the possibility of encountering an error due to a hardware device no longer being present are eliminated.

By having a bus manager restore device configurations rather than each individual device drivers, the time required to re-awaken the system from a suspended state is reduced. Since individual device drivers need not be power management aware, the same device drivers may be utilized in both power managed and non-power managed operating systems and less code is required for power managed systems. Since an independent component checks for device presence, software loaded to support a device removed while the system was suspended may be unloaded without user intervention. Similarly software required to support a device added while the system was suspended may be scheduled to be loaded without user intervention. Because reliance on a bus manager relieves hardware device drivers of the responsibility for reconfiguring devices when the system resumes, drivers need not wait idle in memory for their devices to possibly appear.

Although described in the context of suspend/resume events in a power managed system, the present invention is equally applicable to equivalent situations, such as a laptop or notebook computer being moved from one docking station to another.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method, in a power managed data processing system including a plurality of devices, for restoring configuration data, comprising:

creating a hierarchical name space tree representing devices within the system and correlating each device with a bus to which the respective device is connected;

associating a bus manager with each bus within the system, wherein each bus manager, responsive to a system startup, walks a corresponding bus, detects a configuration of devices connected to the corresponding bus, and creates entries within the name space tree enumerating devices connected to the corresponding bus;

establishing a power management mode during which power to selected buses is suspending without turning off the system upon entering the power management mode and power is restored to the selected buses without rebooting the system upon leaving the power management mode; and employing each bus manager:

to walk a respective bus upon initiation of entry into the power management mode and store configuration data for each device connected to a respective bus prior to the system entering the power management mode; and to walk the respective bus upon leaving the power management mode:

to detect each device connected to the respective bus after leaving the power management mode;

to check entries in the name space tree to determine whether a device connected to the respective bus after leaving the power management mode was connected to the respective bus prior to entering the power management mode; and to restore stored configuration data for each device connected to the respective bus after leaving the power management mode which was connected to the respective bus prior to entering the power management mode.

2. The method of claim 1, wherein the step of creating a hierarchical name space tree representing devices within the system and correlating each device with a bus to which the respective device is connected further comprises:

creating a branch entry for each bus within the system; and for each branch entry, creating an entry under the branch entry for each device connected to a bus corresponding to the respective branch entry.

3. The method of claim 1, wherein the step of creating a hierarchical name space tree representing system devices and correlating each system device with a bus to which the respective device is connected further comprises:

storing an identification of the bus to which the respective device is connected, an identification of a socket to which the respective device is connected, and an identification of system resources allocated to the respective device in a name space tree entry for the respective device.

4. The method of claim 1, further comprising:

registering each bus manager with a power management component for the system.

5. The method of claim 1, further comprising:

upon system startup, employing each bus manager to sequentially check each socket within a respective bus for a device connected to that socket.

6. The method of claim 1, further comprising:

upon entering the power management mode, employing each bus manager to remove power from the respective bus.

7. A system, in a power managed data processing system including a plurality of devices, for restoring configuration data, comprising:

means for creating a hierarchical name space tree representing devices within the system and correlating each device with a bus to which the respective device is connected;

means for associating a bus manager with each bus within the system, wherein each bus manager, responsive to a system startup, walks a corresponding bus, detects a configuration of devices connected to the corresponding bus, and creates entries within the name space tree enumerating devices connected to the corresponding bus;

means for establishing a power management mode during which power to selected buses is suspending without turning off the system upon entering the power management mode and power is restored to the selected buses without rebooting the system upon leaving the power management mode; and means for employing each bus manager:
to walk a respective bus upon initiation of entry into the power management mode and store configuration data for each device connected to a respective bus prior to the system entering the power management mode; and
to walk the respective bus upon leaving the power management mode:
to detect each device connected to the respective bus after leaving the power management mode;
to check entries in the name space tree to determine whether a device connected to the respective bus after leaving the power management mode was connected to the respective bus prior to entering the power management mode; and
to restore stored configuration data for each device connected to the respective bus after leaving the power management mode which was connected to the respective bus prior to entering the power management mode.

8. The system of claim 7, wherein the means for creating a hierarchical name space tree representing devices within the system and correlating each device with a bus to which the respective device is connected further comprises:
means for creating a branch entry for each bus within the system; and
means, for each branch entry, for creating an entry under the branch entry for each device connected to a bus corresponding to the respective branch entry.

9. The system of claim 7, wherein the means for creating a hierarchical name space tree representing system devices and correlating each system device with a bus to which the respective device is connected further comprises:
means for storing an identification of the bus to which the respective device is connected, an identification of a socket to which the respective device is connected, and an identification of system resources allocated to the respective device in a name space tree entry for the respective device.

10. The system of claim 7, further comprising:
means for registering each bus manager with a power management component for the system.

11. The system of claim 7, further comprising:
means, upon system startup, for employing each bus manager to sequentially check each socket within a respective bus for a device connected to that socket.

12. The system of claim 7, further comprising:
means, upon entering the power management mode, for employing each bus manager to remove power from the respective bus.

13. A computer program product in a computer usable medium for restoring configuration data in a power managed data processing system including a plurality of devices, comprising:
instructions for creating a hierarchical name space tree representing devices within the system and correlating each device with a bus to which the respective device is connected;
instructions for associating a bus manager with each bus within the system, wherein each bus manager, responsive to a system startup, walks a corresponding bus, detects a configuration of devices connected to the corresponding bus, and creates entries within the name space tree enumerating devices connected to the corresponding bus;

instructions for establishing a power management mode during which power to selected buses is suspending without turning off the system upon entering the power management mode and power is restored to the selected buses without rebooting the system upon leaving the power management mode; and instructions for employing each bus manager:
to walk a respective bus upon initiation of entry into the power management mode and store configuration data for each device connected to a respective bus prior to the system entering the power management mode; and
to walk the respective bus upon leaving the power management mode:
to detect each device connected to the respective bus after leaving the power management mode;
to check entries in the name space tree to determine whether a device connected to the respective bus after leaving the power management mode was connected to the respective bus prior to entering the power management mode; and
to restore stored configuration data for each device connected to the respective bus after leaving the power management mode which was connected to the respective bus prior to entering the power management mode.

14. The computer program product of claim 13, wherein the instructions for creating a hierarchical name space tree representing devices within the system and correlating each device with a bus to which the respective device is connected further comprises:
instructions for creating a branch entry for each bus within the system; and
instructions, for each branch entry, for creating an entry under the branch entry for each device connected to a bus, corresponding to the respective branch entry.

15. The computer program product of claim 13, wherein the instructions for creating a hierarchical name space tree representing system devices and correlating each system device with a bus to which the respective device is connected further comprises:
instructions for storing an identification of the bus to which the respective device is connected, an identification of a socket to which the respective device is connected, and an identification of system resources allocated to the respective device in a name space tree entry for the respective device.

16. The computer program product of claim 13, further comprising:
instructions for registering each bus manager with a power management component for the system.

17. The computer program product of claim 13, further comprising:
instructions, upon system startup, for employing each bus manager to sequentially check each socket within a respective bus for a device connected to that socket.

* * * * *